US012187578B2

(12) United States Patent
Muñoz Sotoca et al.

(10) Patent No.: US 12,187,578 B2
(45) Date of Patent: Jan. 7, 2025

(54) PROTECTOR FOR AN ELEVATOR CAR

(71) Applicant: Otis Elevator Company, Farmington, CT (US)

(72) Inventors: Javier Muñoz Sotoca, Madrid (ES); Borja de Diego Restrepo, Madrid (ES)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 18/519,988

(22) Filed: Nov. 27, 2023

(65) Prior Publication Data

US 2024/0375914 A1 Nov. 14, 2024

(30) Foreign Application Priority Data

May 12, 2023 (EP) .................................... 23382443

(51) Int. Cl.
*B66B 11/02* (2006.01)

(52) U.S. Cl.
CPC ...... *B66B 11/0253* (2013.01); *B66B 11/0233* (2013.01); *B66B 11/024* (2013.01)

(58) Field of Classification Search
CPC ....................... B66B 11/0253; B66B 11/0233; B66B 11/024
See application file for complete search history.

(56) References Cited

U.S. PATENT DOCUMENTS 7,322,714 B2 * 1/2008 Barnett ............... F21V 21/0824 362/152
9,004,718 B2 * 4/2015 Myers .................. F21V 19/001 362/224
9,951,915 B2 * 4/2018 Hierzer ..................... F21S 4/28
10,018,349 B2 * 7/2018 Green ................... F21V 33/006
10,252,887 B2 * 4/2019 Fauconnet .......... B66B 11/0253
10,352,507 B2 * 7/2019 Deng ...................... F21K 9/272
10,371,361 B2 * 8/2019 Chien ..................... F21V 15/01
10,442,663 B2 * 10/2019 Okabe ................. B66B 11/0233
10,520,143 B1 * 12/2019 Findlay .................. F21V 31/04
10,670,204 B1 * 6/2020 Li ....................... H01L 25/0753

(Continued)

FOREIGN PATENT DOCUMENTS

CN 107043063 A 8/2017
CN 214192163 U 9/2021

(Continued)

OTHER PUBLICATIONS

European Search Report for application EP 23382443.2, dated Oct. 18, 2023, 53 pages.

*Primary Examiner* — Michael A Riegelman
(74) *Attorney, Agent, or Firm* — CANTOR COLBURN LLP

(57) ABSTRACT

A protector (200) for an elevator car (102) includes a protective panel (202) and at least one magnet (204) mounted to the protective panel (202). The magnet (204) is configured to be attracted to an internal wall (106) of a passenger compartment (104) of an elevator car (102) so as to retain the protective panel (202) against the internal wall (106). The magnet (204) may be retained against a support (210) of the protector (200) by a retainer assembly (220). The protector (200) may further comprise an electrical device which comprises a lighting device (240) configured to emit light into the passenger compartment (104) of the elevator car (102).

13 Claims, 6 Drawing Sheets

(56) References Cited

U.S. PATENT DOCUMENTS

| | | | | |
|---|---|---|---|---|
| 10,746,360 | B2 * | 8/2020 | Brown | F21S 4/28 |
| 11,015,787 | B2 * | 5/2021 | Evans | F21V 7/0008 |
| 11,112,556 | B2 * | 9/2021 | Grigore | G02B 6/0078 |
| 11,208,778 | B1 * | 12/2021 | Ellingson | E02B 3/06 |
| 11,313,524 | B2 * | 4/2022 | Bianchi | F21V 7/005 |
| 11,339,932 | B2 * | 5/2022 | Meir | F21S 4/28 |
| 11,454,360 | B2 * | 9/2022 | Monestier | F21V 15/01 |
| 11,760,603 | B2 * | 9/2023 | Cortes Rodriguez | B66B 11/0253 187/414 |
| 2011/0090676 | A1 * | 4/2011 | Sortor | F21V 17/16 362/232 |
| 2016/0369958 | A1 * | 12/2016 | Kohshima | F21S 8/00 |
| 2018/0072538 | A1 * | 3/2018 | Fauconnet | B66B 11/0253 |
| 2018/0142869 | A1 * | 5/2018 | Pallai | F21V 23/005 |
| 2018/0209601 | A1 * | 7/2018 | Doubek | F21V 7/0008 |
| 2018/0237267 | A1 * | 8/2018 | Coldre | F16B 5/0084 |
| 2019/0376670 | A1 * | 12/2019 | Ludwig | F21V 15/015 |
| 2020/0385236 | A1 * | 12/2020 | Cortes Rodriguez | B66B 1/466 |

FOREIGN PATENT DOCUMENTS

| | | | | | |
|---|---|---|---|---|---|
| CN | 214652880 | U | | 11/2021 | |
| CN | 215101374 | U | | 12/2021 | |
| CN | 216583719 | U | | 5/2022 | |
| CN | 216785406 | U | | 6/2022 | |
| CN | 217402381 | U | | 9/2022 | |
| DE | 402013002475 | S | | 8/2013 | |
| DE | 202016101233 | U1 | | 4/2016 | |
| DE | 202017103992 | U1 | | 8/2017 | |
| DE | 202019104479 | U1 | | 8/2019 | |
| DE | 102018001908 | A1 | | 9/2019 | |
| EM | 002646448 | S | | 3/2015 | |
| EP | 2933551 | B1 | | 6/2017 | |
| EP | 2944868 | B1 | | 7/2017 | |
| EP | 2902697 | B1 | | 7/2018 | |
| EP | 3259524 | B1 | | 5/2019 | |
| EP | 3292349 | B1 | | 6/2019 | |
| EP | 3604912 | A1 | | 2/2020 | |
| EP | 3722659 | A1 | | 10/2020 | |
| EP | 3747818 | A1 | * | 12/2020 | B66B 1/466 |
| JP | S572933 | B2 | | 1/1982 | |
| JP | H09165171 | A | | 6/1997 | |
| JP | 2002114469 | A | | 4/2002 | |
| JP | 2014076874 | A | | 5/2014 | |
| KR | 20230163279 | A | * | 11/2023 | |
| WO | 2011101963 | A1 | | 8/2011 | |
| WO | 2019013656 | A1 | | 1/2019 | |
| WO | 2020050846 | A1 | | 3/2020 | |

* cited by examiner

PROTECTOR FOR AN ELEVATOR CAR

FOREIGN PRIORITY

This application claims priority to European Patent Application No. 23382443.2, filed May 12, 2023, and all the benefits accruing therefrom under 35 U.S.C. § 119, the contents of which in its entirety are herein incorporated by reference.

TECHNICAL FIELD

This disclosure relates to a protector for an elevator car. In particular, the disclosure may be applicable to a protector for an elevator car wall, such as for example a kickplate.

BACKGROUND

Elevator car walls, in particular the internal walls of an elevator car, are susceptible to damage during use of the elevator car. This could for example be caused by passengers leaning against or kicking the elevator car walls, or by impact from other items such as cargo being transported in the elevator car. Should the elevator car wall need repairing or replacing, a temporary shutdown of the elevator system and/or removal of the elevator car for maintenance would be needed. Elevator shutdowns are inconvenient for passengers and building managers and therefore should be avoided. There is therefore a need for protectors to be placed on the elevator car walls to protect the walls from damage.

Protectors known in the art may be attached to the wall using attachment mechanisms such as screws and bolts, or adhesives. These attachment mechanisms not only potentially mark or damage the elevator car wall, but they also take significant time to install and remove should the protector need to be replaced or moved. Because of the significant installation and removal time, more time will be spent when maintenance personnel wish to access the elevator car wall behind the protector, access the face of the protector which faces the elevator car wall, or move the protector to a different location on the elevator car wall.

The present disclosure seeks to address at least some of the drawbacks described above.

SUMMARY

According to a first aspect of the disclosure, there is provided a protector for an elevator car. The protector comprises a protective panel; and one or more magnets mounted to the protective panel. The one or more magnets are configured to be attracted to an internal wall of a passenger compartment of an elevator car so as to retain the protective panel against the internal wall.

It will be understood that the protector according to the disclosure uses one or more magnets to retain the protective panel against the internal wall. This may provide a quick and straightforward means of attaching a protective panel to an internal wall of a passenger compartment of an elevator car. This may also allow the protective panel to be attached or fixed to the internal wall without the need to use fixing means such as screws or adhesives which would typically mark or damage the wall.

The one or more magnets could be mounted directly on the protective panel. In any example of the disclosure however, the protector may further comprise a support for mounting at least one of the one or more magnets to the protective panel. The support may space the at least one of the one or more magnets from the protective panel. This may allow the protective panel to be attached to the internal wall whilst also being spaced therefrom.

In some examples, the one or more magnets could be held against the support by magnetic attraction. In some examples however, it may be useful to provide means for holding the one or more magnets on or against the support. In any example of the disclosure, the protector may further comprise a retainer assembly which retains at least one of the one or more magnets against the support.

The retainer assembly could take many different forms. In any example of the disclosure, the retainer assembly may comprise first and second retainers extending outwardly from the protective panel. The first and second retainers may partially overlap the at least one of the one or more magnets such that the at least one of the one or more magnets is retained against the support.

In any example of the disclosure, the first and second retainers may each comprise a retainer bracket and a retainer lip. The first and second retainer brackets may extend away from the protective panel, and the first and second retainer lips may be disposed at the distal ends of the first and second retainer brackets. The first and second retainer lips may extend over part of the at least one of the one or more magnets, such that the at least one of the one or more magnets is retained between the first and second retainer lips and the support.

In any example of the disclosure, in addition to the examples of the retainer assembly described above or as an alternative, the retainer assembly may comprise a fastener extending through at least a part of at least one of the one or more magnets to fix the at least one of the one or more magnets to the support.

It will be understood that the protector comprises a protective panel for protecting the internal wall against damage. The protector may also house one or more further components for use inside the elevator car. In any example of the disclosure therefore, the protector may further comprise a component which may comprise one or more of an electrical device, an air freshener, a sound system, one or more sensors and a conduit for a fluid.

The component could be mounted to the protector in many ways, for example by being attached directly to or suspended from the protective panel. In any example of the disclosure however, the component may be disposed on a component support extending away from the protective panel.

In any example of the disclosure, the component may comprise an electrical device comprising a lighting device configured to emit light into the passenger compartment of the elevator car.

In any example of the disclosure, when the component comprises the electrical device, an electrical cable for powering and/or providing a signal to the electrical device may be mounted in a gap defined by the protective panel and a cable support.

In any example of the disclosure, the protector may comprise a diffuser. The diffuser may comprise a light diffuser. The diffuser may be disposed between the component and the passenger compartment so as to diffuse an output from the component to the passenger compartment.

According to a further aspect of the disclosure, there is provided an elevator car comprising: a passenger compartment defined by a floor, one or more internal walls and a ceiling; and one or more protectors as disclosed in any of the embodiments above, wherein the protective panel of the or each protector is retained against an internal wall of the elevator car by the one or more magnets.

It will be understood that the one or more protectors could be positioned anywhere desired within the elevator car. In any example of the disclosure, the one or more protectors may extend along part or all of the one or more internal walls adjacent to or abutting the floor.

According to a yet further aspect of the disclosure, there is provided a method for attaching the protector of any previous example to an internal wall of an elevator car, the method comprising: installing the protector adjacent to the internal wall, wherein the protective panel is held against the internal wall by the one or more magnets.

The one or more magnets could be mounted to the protective panel in any desired way. In any example of the disclosure however, the method may further comprise sliding at least one of the one or more magnets into a space defined by the first and second retainer lips, the support pad, and the first and second retainer brackets of the retainer assembly described above.

The method may further comprise sliding at least one of the one or more magnets along a part or all of the length of the protector.

The method may further comprise sliding one or more further magnets along a part or all of the length of the protector such that the magnets are spaced along the length of the protector.

In other examples, or in addition to the above, the method may comprise inserting a fastener to extend through at least a part of at least one of the one or more magnets to fix the at least one of the one or more magnets to the support.

According to a yet further aspect of the disclosure, there is provided a method of removing the protector of any previous example from an internal wall of an elevator car, the method comprising: using a threaded screw mounted between the protector and the internal wall to push the protective panel away from the internal wall.

In any example, the method of removing the protector may comprise: forming a bore hole in the protective panel; and/or inserting a fastener into a bore hole in the protective panel and attaching the fastener to the protective panel.

In any example of the disclosure, the method may further comprise inserting a bolt through the fastener.

In any example of the disclosure, the method may further comprise: rotating the bolt so as to pass the bolt through the fastener such that the bolt extends outwardly from the protective panel towards the internal wall and then comes into contact with the internal wall; and further rotating the bolt so as to continue to pass the bolt through the fastener such that the protective panel is pushed away from the internal wall by the bolt.

In any example of the disclosure, the method may further comprise manually removing the protector from the internal wall.

From a still further aspect of the disclosure, a method of replacing the protector as described in any of the examples above is also disclosed. The method comprises: pulling a first protector away from the internal wall of an elevator car, optionally by one of the example removal methods described above; and installing a second protector on the internal wall, the protective panel of the second protector being attached to the internal wall by the one or more magnets.

DRAWING DESCRIPTION

Figure 7A:
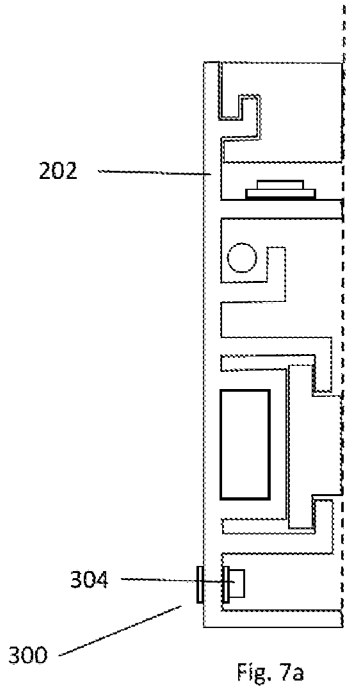
Figure 7B:
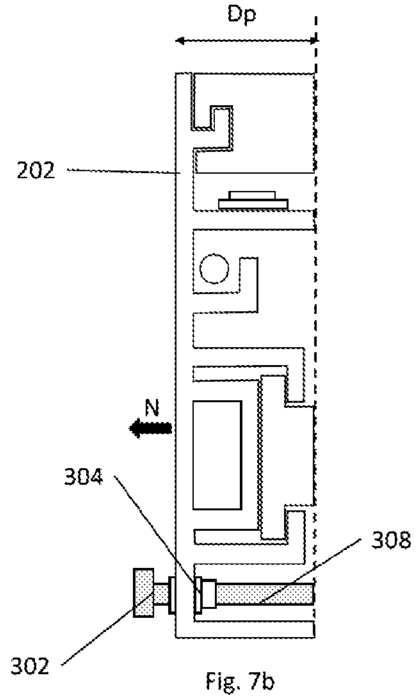
Figure 8A:
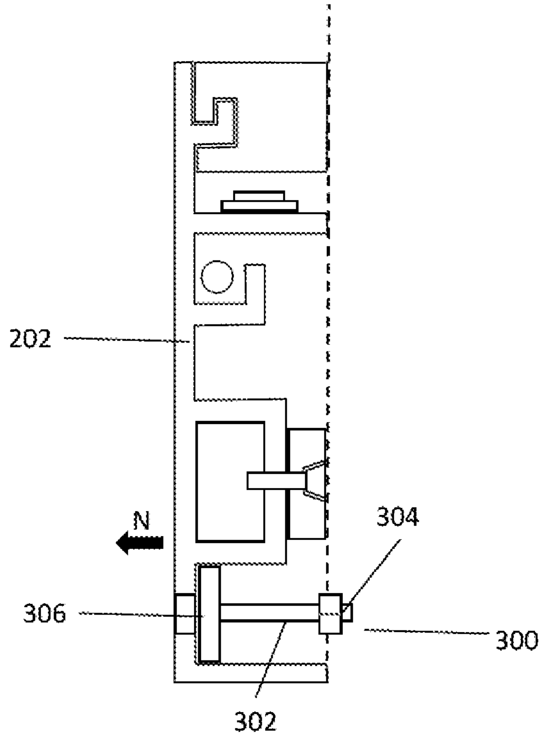
Figure 8B:
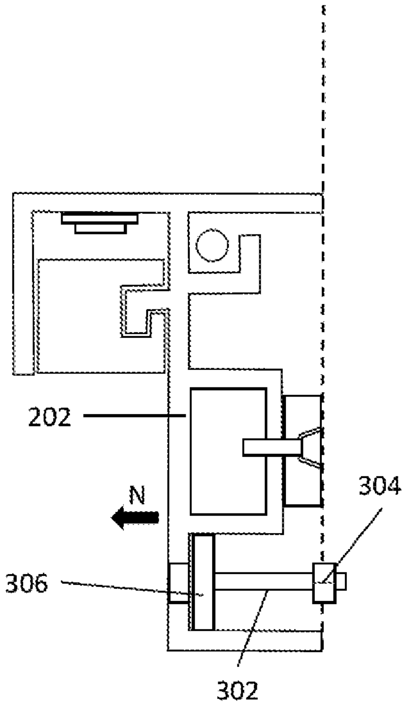

FIGS. 7*a* and 7*b* are perspective views of a protector including a removal assembly according to a yet further example of the disclosure; and FIGS. 8*a* and 8*b* are perspective views of two different example protectors including a removal assembly according to a yet further example of the disclosure.

DETAILED DESCRIPTION

Figure 1:
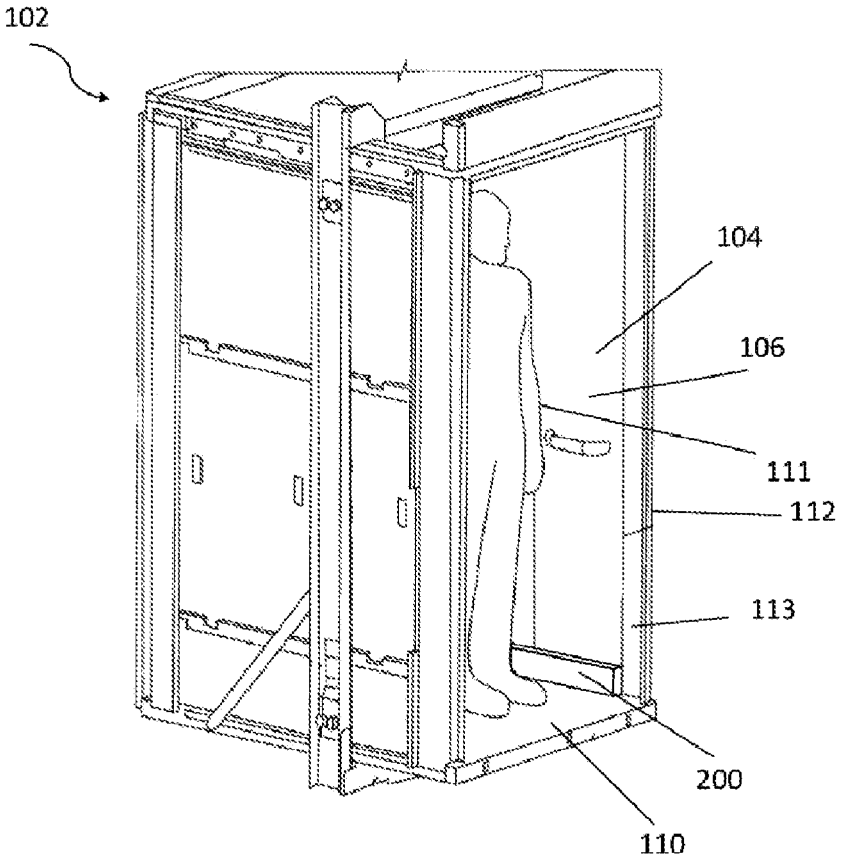
FIG. 1 is a schematic perspective view of an elevator car according to at least one example of the disclosure.
Figure 2:
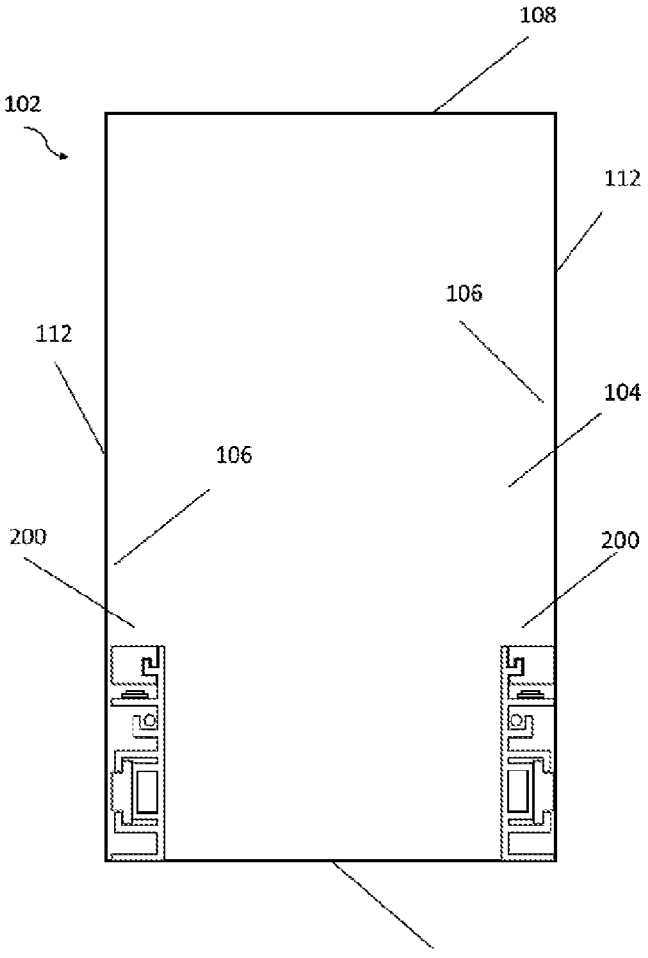
FIG. 2 is a schematic illustration of a sectional view of an elevator car according to at least one example of the disclosure.

FIGS. 1 and 2 show an elevator car 102 forming part of an elevator system (not shown) and configured to move up and down within a hoistway (not shown). Although the elevator system is not shown in the drawings, it will be appreciated that the elevator system may include other standard components including but not limited to a drive means, a tension member, a counterweight, a controller, a power source and a plurality of elevator landing doors.

As seen in FIGS. 1 and 2, the elevator car 102 comprises a passenger compartment 104 defined by one or more internal walls 106, a ceiling 108 and a floor 110. In any example of the disclosure, any of the internal walls 106, ceiling 108 and floor 110 may comprise a magnetic material such as a metal. The passenger compartment 104 is configured to contain and transport one or more passengers 111 using the elevator system (not shown). It will be understood that, in any example such as that shown in FIG. 2, the elevator car 102 may comprise one or more side walls 112 which form the internal walls 106 of the passenger compartment 104. In other examples however, panels or covers 113 (as seen in FIG. 1) are attached to the side walls 112 and/or to the floor 110 or ceiling 108, which panels 113 extend internally of the side walls 112 and form some or all of the internal walls 106 of the passenger compartment 104. Such panels 113 may improve the aesthetics of the passenger compartment 104 and/or provide sound or heat insulation from the environment external to the passenger compartment 104. There may be a plurality of panels 113 of any shape on each side wall 112, or a single panel 113 may cover an entire side wall 112 and/or ceiling 108.

In any example of the disclosure, the elevator car 102 also comprises one or more protectors 200 disposed along one or more of the internal walls 106 thereof. The protectors 200 are configured to protect the internal walls 106 from being damaged by passengers 111 and/or cargo (not shown) in the passenger compartment 104. The protectors 200 could be located at any suitable point on a wall, for example at a height suitable to protect the wall from passengers 111 leaning against it. In some examples, the protectors 200 may be disposed at or towards the bottom of the internal wall 106, adjacent to and either forming a small gap with the floor 110 or in contact with the floor 110 of the elevator car 102. Such protectors 200 can prevent damage that could for example be caused by passengers 111 kicking or leaning against the elevator car 102. The protectors 200 may also improve the aesthetic of the passenger compartment 104, improving user satisfaction.

Figure 3:
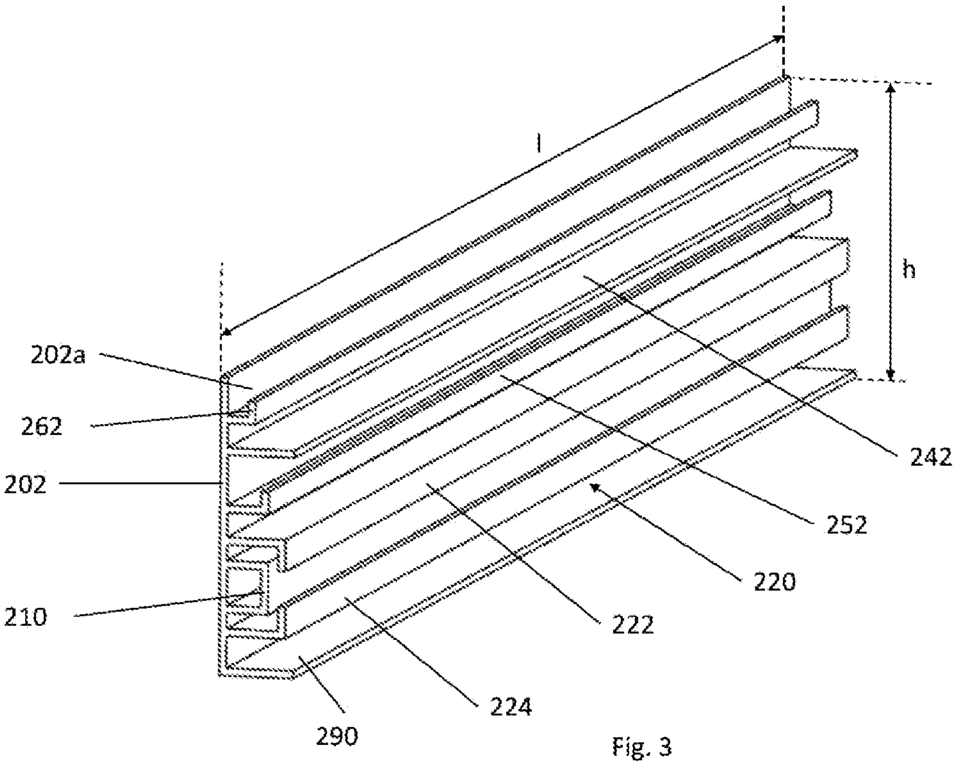
FIG. 3 is a perspective view of a part of a protector according to an example of the disclosure.
Figure 4:
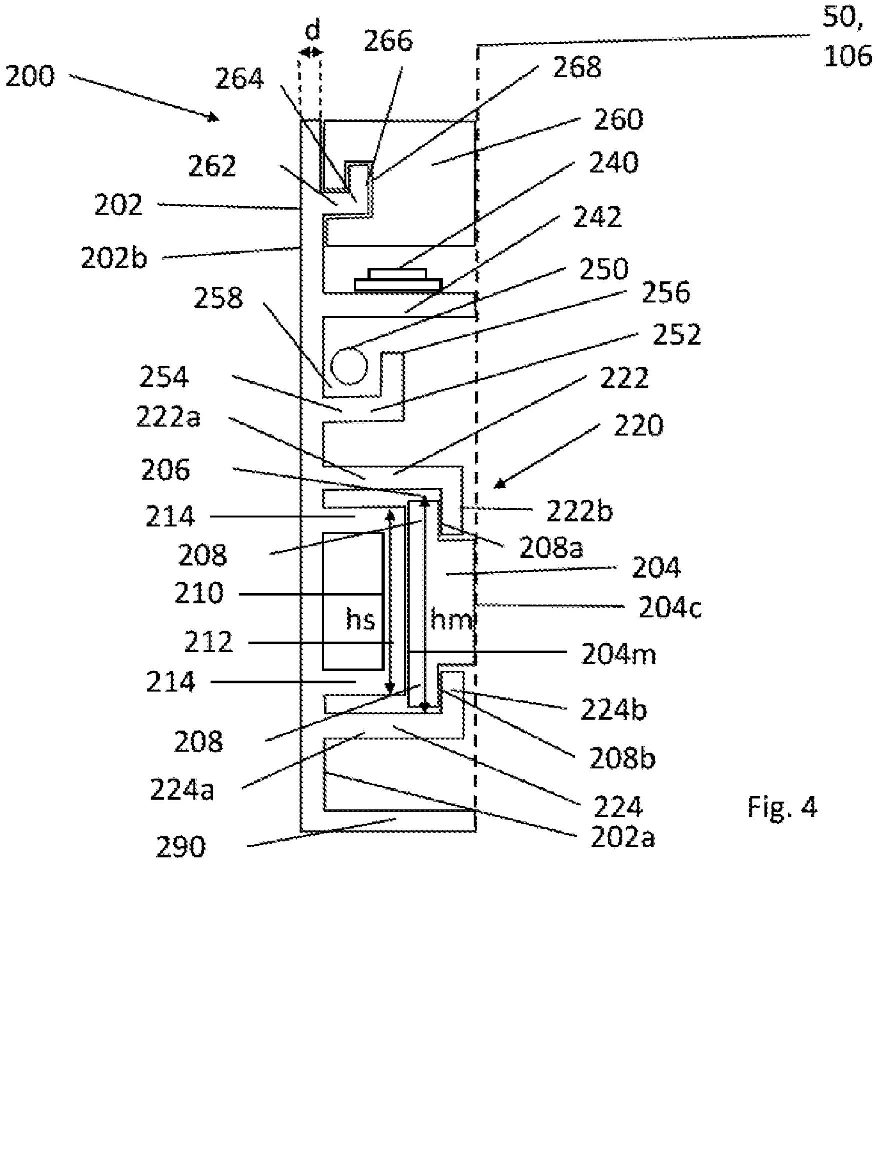
FIG. 4 is a cross-sectional view of a protector according to at least one example of the disclosure.

FIG. 3 shows a schematic perspective view of part of a protector 200 according to an example of the disclosure. FIG. 4 is a cross-sectional view of the protector 200 of FIG. 3. The protector 200 will now be described in further detail with reference to the drawings. While only one protector 200 is described below, it will be appreciated that one or more such protectors 200 may be installed in a passenger compartment 104, for example extending along each internal wall 106, in some examples thereby surrounding the floor 110 of the elevator car 102. In any example of the disclosure, the protector 200 is configured to be attached to an internal wall 106 of the passenger compartment 104 of the elevator car 102. At least in some examples, the protector 200 may be positioned adjacent or near to or may abut the floor 110 of the elevator car 102.

In any example of the disclosure, the protector 200 comprises a protective panel 202 which comprises a first side 202*a* and a second side 202*b*, as seen for example in FIG. 4. The first side 202*a* is configured to face the internal wall 106 to which the protector 200 is mounted and the second side 202*b* is configured to face into the passenger compartment 104 when the protector 200 is attached to the internal wall 106. In at least some examples, the protective panel 202 may be configured to extend parallel or substantially parallel to the internal wall 106. In any example of the disclosure and wherever the term "substantially" is used, "substantially" will be understood to mean within a range of + or −10 degrees, or + or −5 degrees, or + or −1 degrees to the direction described.

In all examples of the disclosure, the protective panel 202 comprises a height h, a length l (as seen in FIG. 3) and a depth d (as seen in FIG. 4). The depth d of the protective panel 202 is defined as the shortest distance between the first side 202*a* and the second side 202*b* of the protective panel 202. The length l of the protective panel 202 may be the largest of the three dimensions, the height h of the protective panel 202 may be the second largest, and the depth d may be the smallest. The depth d may be less than the height h, and/or the height h may be less than the length l. The protector 200 is configured to be positioned adjacent to the internal wall 106 such that the length l of the protector 200 extends parallel or substantially parallel to the internal wall 106 and/or to the floor 110. The height h extends at about 90 degrees to the length l, substantially parallel with the internal wall 106 and substantially normal to the floor 110. The depth d extends substantially normal to the surface of the internal wall 106, substantially parallel to the floor 110. The protector 200 may extend only along a portion of the length (not shown) of an internal wall 106 of the passenger compartment 104, such that other protectors 200 may be placed adjacent to each other to form one continuous length (not shown) of protective panels 202, covering a portion of or the entire length of each internal wall 106. At least in some examples of the disclosure, the protective panel 202 is configured to be spaced from the internal wall 106 when assembled into the elevator car 102.

The protector 200 comprises one or more magnets 204 (as shown for example in FIG. 4) which are configured to retain the protective panel 202 against the internal wall 106. The one or more magnets 204 exert a magnetic force on the internal wall 106, thereby urging the protector 200 (including the protective panel 202) into removable attachment with the internal wall 106. Using magnets in this way provides a significantly easier method for attaching and removing the protector 200 to/from the internal wall 106 than the methods known in the state of the art. The previously known methods involve a bolt, screw, adhesive or other kind of semi-permanent or permanent fixing, all of which require more time to install than the magnetic system described above. The previously known methods can also cause damage to the internal wall 106, for example requiring holes to be drilled in the internal wall 106 or causing surface damage to the internal wall 106 when removing a protector 200 fixed using adhesive. Further, protectors attached using the previously known methods are not as easily removed, for example to permit maintenance of either the protector or the elevator car 102. The use of magnets 204 eliminates or reduces the need for a bolt, screw and/or adhesive, thereby providing a more convenient and less destructive way for attaching and removing the protector 200 to/from the internal wall 106.

At least in some examples of the disclosure, the or each magnet 204 may produce a sufficiently strong magnetic field, which results in a sufficiently strong force of magnetic attraction between the magnets 204 and the internal wall 106 such that passengers are not likely to accidentally remove the protectors 200 from attachment with the internal wall 106. The magnets 204 may be sufficiently strong such that only motivated maintenance personnel may remove the protector 200 from attachment with the internal wall 106. The maintenance personnel may swiftly and easily remove the protector 200 without the need for any specialist tools, enabling them to gain access to the hidden part of the internal wall 106 and the protector 200 more quickly, and therefore to perform maintenance more quickly. Upon completion of the maintenance, the maintenance personnel may re-attach the protector 200 to the internal wall 106 if desired. The protector 200 may be attached and/or removed many times without damaging the protector 200 or the elevator car 102 and without reducing the strength of the attachment of the protector 200 to the internal wall 106. At least in some examples of the disclosure, the magnetic force of attraction between each magnet 204 and the internal wall 106 may be between 1N and 400N, optionally between 300N and 400N.

The manufacturing process to produce the magnets 204 may include a moulding-sintering process. The manufacturing process to produce the magnets 204 may also include subtractive manufacturing techniques such as machining, which may include lathe-turning, milling, cutting, boring, drilling and grinding. The magnets 204 comprise any suitable ferromagnetic material, for example the magnets 204 may comprise any of neodymium, samarium cobalt, alnico and ferrite.

FIG. 4 is a cross-sectional view through the protector 200 shown in FIG. 3. The protector 200 comprises a protective panel 202 and one or more magnets 204 as described above. It will be appreciated that in at least some examples of the disclosure, the protector 200 may comprise a plurality of magnets 204. It will be understood that any suitable number of magnets 204 may be provided and that the magnets 204 can be spaced from each other by any desired amount along the length l of the protective panel 202. The magnets 204 can be evenly spaced from each other or spaced by varying amounts. Further, groups of two or more magnets 204 could be provided in alignment along the height h of the protective panel 202 or in any other desired arrangement. In the example of FIG. 4, only a single magnet 204 is provided and so only one magnet 204 is described here. In any example of the disclosure, the protector 200 is configured to be attached to an internal wall 106 of an elevator car 102, where the internal wall 106 is shown schematically in FIG. 4 as the dotted line 50.

In any example of the disclosure, the protector 200 may comprise a support 210 which mounts the magnet 204 to the protective panel 202. The support 210 may space the magnet 204 from the protective panel 202. The support 210 may be formed integrally with the protective panel 202 (for example, by extrusion as will be described further below) or may be attached to the protective panel 202. The support 210 may comprise a support pad 212 and one or more support brackets 214. In at least one example of the disclosure, two support brackets 214 may extend substantially perpendicularly outward from the first side 202*a* of the protective panel 202. The support brackets 214 may extend across the entire length l of the protective panel 202, and may be spaced from each other along the height h of the protective panel 202. The support brackets 214 may each extend by substantially the same distance from the protective panel 202, and the support pad 212 may be disposed at a distal end of the support brackets 214, extending between the support brackets 214, thereby connecting the support brackets 214. The support pad 212 may extend substantially parallel to the protective panel 202 and may be spaced from the protective panel 202.

In at least one example of the disclosure, for example when the protector 200 comprises a metal or magnetically attractive material, the magnet 204 may be mounted to the protector 200 by magnetic attraction of the magnet 204 to the support pad 212. In any example of the disclosure however, the magnet 204 may additionally or alternatively be retained against the support pad 212 by a retainer assembly 220. In some examples of the disclosure, the retainer assembly 220 may extend at least partially around the magnet 204 such that the magnet 204 is retained between the retainer assembly 220 and the support pad 212. The retainer assembly 220 may be formed integrally with the protective panel 202 (for example, by extrusion as will be described further below) or may be attached to the protective panel 202. The magnet 204 may comprise a mounting face 204*m* that contacts the support pad 212 when the magnet 204 is retained in the protector 200 by the retainer assembly 220. The magnet 204 may comprise an attachment face 204*c*, which at least in some examples is configured to face towards and contact the internal wall 106 when the protector 200 is attached to the internal wall 106. In at least one example, the height hm of the mounting face 204*m* may be equal to or larger than the height hs of the support pad 212. The midpoint (not shown) of the height hm of the magnet 204 may be placed into alignment with the midpoint (not shown) of the height hs of the support pad 212.

In alternative examples of the disclosure wherein the one or more magnets 204 are configured to retain the protective panel 202 against the internal wall 106 as described above, the attachment face 204*c* may be configured to face towards the internal wall 106 and retain the protective panel 202 against the wall without the attachment face 204*c* being in direct contact with the internal wall 106. In said alternative examples, the one or more magnets 204 may produce a magnetic force of attraction that is sufficiently strong such that the protective panel 202 is retained again the internal wall without the one or magnets 204 being in direct contact with the internal wall. In such examples the one or more magnets 204 may be spaced from the internal wall 106 by a part of the protector 200, by a part of the internal wall 106, or by a component that does not form part of the protector 200 or the internal wall 106.

In some examples of the disclosure and as shown for example in FIG. 4, the retainer assembly 220 may comprise a first retainer 222 and a second retainer 224. The first retainer 222 may be disposed above the support 210 in the height dimension and the second retainer 222 may be disposed below the support 210 in the height dimension. The first and second retainers 222, 224 may comprise first and second retainer brackets 222*a*, 224*a* and retainer lips 222*b*, 224*b* respectively. In all examples of the disclosure including the first and second retainers 222, 224, the first and second retainer brackets 222*a*, 224*a* may extend from the protective panel 202. In at least some examples of the disclosure including the first and second retainers 222, 224, the first and second retainer brackets 222*a*, 224*a* may extend substantially perpendicularly from the protective panel 202.

In any example of the disclosure including the first and second retainers 222, 224, the first and second retainer lips 222*b*, 224*b* may be disposed at the distal ends of the first and second retainer brackets 222*a*, 224*a* respectively. In any example of the disclosure including the first and second retainers 222, 224, the first and second retainer lips 222*b*, 224*b* may extend toward each other. In at least one example of the disclosure, the first and second retainer lips 222*b*, 224*b* may extend substantially parallel to the protective panel 202. The first and second retainer lips 222*b*, 224*b*, the support pad 212 and the first and second retainer brackets 222*a*, 224*a* may at least partially define a space 206. In at least some examples of the disclosure, the magnet 204 or a portion thereof may be disposed in the space 206. In any example of the disclosure including retainers, the first and second retainer lips 222*b*, 224*b* may overlap with or extend over first and second mating faces 208*a*, 208*b* of the magnet 204, which are configured to face towards the internal wall 106, thereby retaining the magnet 204 in the space 206 against the support pad 212. The first and second retainer lips 222*b*, 224*b* may overlap with the first and second mating faces 208*a*, 208*b* such that a gap remains between the first and second retainer lips 222*b*, 224*b* and the first and second mating faces 208*a*, 208*b* of the magnet 204. In other examples, the first and second retainer lips 222*b*, 224*b* may overlap with and contact the first and second mating faces 208*a*, 208*b*.

In at least some examples of the disclosure, the first and second mating faces 208*a*, 208*b* of the magnet 204 may form shoulders disposed on the first and second notches 208, the first and second notches 208 extending from the magnet 204, parallel to the protective panel 202. The first and second notches 208 may have a depth less than that of the magnet 204 and may be placed anywhere along the depth of the magnet 204. However, in alternative examples of the disclosure, the notch 208 may have substantially the same depth as the magnet 204, and the first and second mating faces 208*a*, 208*b* of the magnet 204 may be flush with the attachment face 204*c*.

Figure 5:
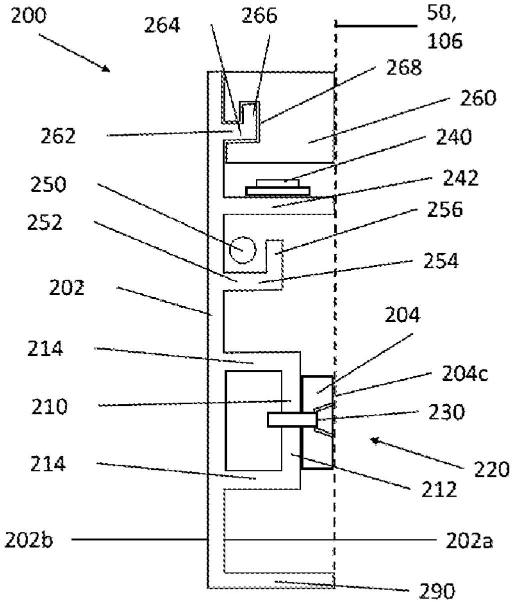
FIG. 5 is a cross-sectional view of a protector according to another example of the disclosure.

As shown in FIG. 5, in addition to or as an alternative to the retainers described above and shown in FIG. 4, the retainer assembly 220 may comprise one or more fasteners 230. In any example of the disclosure including a fastener 230, the one or more fasteners 230 may extend through part or all of the magnet 204. In at least some of the examples of the disclosure, the fastener 230 may extend through the attachment face 204*c* of the magnet 204. In at least some examples of the disclosure, the fastener 230 may extend through the support pad 212. However, in alternative examples, the fastener 230 may extend only partially through the support pad 212. In further alternative examples, a fixing such as a nut (not shown) may be disposed on a first face of the support pad 212 and configured to face towards the internal wall 106 into which the fastener 230 may be disposed such that the fastener 230 does not extend through the support pad 212. In any example of the disclosure including a fastener 230, the one or more fasteners 230 retain the magnet 204 against the support pad 212. In one example of the disclosure, the fastener 230 may be a screw.

In one example of the disclosure, the retainer assembly 220 can comprise both the first 222 and second retainers 224 and one or more fasteners 230. In another example, the retainer assembly 220 comprises only the first 222 and second retainers 224. In a yet further example, the retainer assembly 220 comprises only the fastener 230.

In any example of the disclosure, the protector 200 may further comprise a component which may include one or more of an electrical device, an air freshener, a sound system, one or more sensors, and a conduit for a fluid. In some examples, the conduit for a fluid could be for hydraulic or pneumatic fluid for use in hydraulic or pneumatic systems. In other examples, the conduit for a fluid could be for a fluid for use in air conditioning, heat exchangers or odour control for example. In the arrangement shown in the Figures, the component is shown as an electrical device which comprises a lighting device 240 as discussed further below. In any example, the electrical device may receive power and/or be controlled via a wireless connection with a power source (not shown) and/or a controller (not shown). In any example, the electrical device may receive power via an electrical cable 250, also comprised within the protector 200. The electrical cable 250 may be configured to be connected to the power in the elevator car 102, for example it may be connected to an elevator car control panel (not shown). The electrical device may be configured to receive power from any power source, in one example the elevator car control panel (not shown), via the electrical cable 250. The electrical device may be configured to be controlled via signals such as electrical signals received via the electrical cable 250.

In any example of the disclosure, the electrical cable 250 may be mounted in a cable gap 258 defined by the protective panel 202 and a cable support 252. The cable support 252 may extend under the electrical cable 250 such that the electrical cable 250 rests on the cable support 252 and is supported by it. The cable support 252 may be formed integrally with the protective panel 202 (for example, by extrusion as will be described further below) or may be attached to the protective panel 202. The cable support 252 may comprise a first member 254 and a second member 256. The first member 254 may extend away from the protective panel 202, and the second member 256 may be disposed at a distal end of the first member 254 and extend away from the first member 254. In at least some examples of the disclosure, the first member 254 may extend substantially perpendicularly from the protective panel 202, and the second member 256 may extend substantially parallel with the protective panel 202. In at least some examples of the disclosure, the first member 254 may be configured to extend towards the internal wall 106 shown by dotted line 50. In alternative examples of the disclosure, the first member 254 may be configured to extend into the passenger compartment 104. The cable gap 258 may be defined by the protective panel 202, the first member 254, and the second member 256.

In examples of the disclosure, the electrical device may comprise any of an air freshener, a sound system or one or more sensors. In an alternative example of the disclosure, the electrical device may comprise a lighting device 240. The lighting device 240 may comprise one or more LEDs, for example in an LED strip, although any other electrical light source may be used. The lighting device 240 may be configured to emit light into the passenger compartment 104, providing further illumination and improving the aesthetic of the elevator compartment 104, thereby improving user experience.

Figure 6:
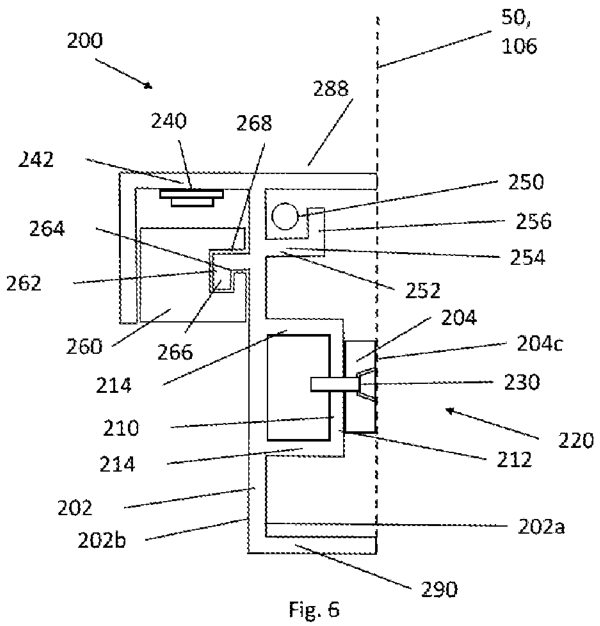
FIG. 6 is a cross-sectional view of a protector according to yet another example of the disclosure.

The electrical device or any other component including but not limited to the alternatives described above (for example the lighting device 240) may be disposed on a component support 242 that extends away from the protective panel 202. The component support 242 may be formed integrally with the protective panel 202 (for example, by extrusion as will be described further below) or may be attached to the protective panel 202. The component support 242 may be configured to space the protective panel 202 from the internal wall 106. In some examples of the disclosure as seen in FIGS. 4 and 5, the component support 242 extends from the first side **202*a* of the protective panel 202 such that the electrical device may be mounted between the protective panel 202 and the internal wall 106 to which the protective panel 202 is mounted. In other examples of the disclosure as seen in FIG. 6, the component support 242 may be configured to extend from the second side 202*b* of the protective panel 202 such that the electrical device may be mounted within the passenger compartment 104, externally of the protective panel 202. In these or any other examples, a spacer 288 may be provided extending from the first side 202*a* of the protective panel 202 so as to extend between the protective panel 202 and the internal wall 106 to space the protective panel 202 from the internal wall 106**.

In any example of the disclosure including a component, such as, for example, the electrical device, the component may be disposed on top of or underneath the component support 242. In other words, the component may be disposed on a first side of the component support 242 so as to face towards the floor 110 of the elevator car 102 when the protector 200 is installed on an internal wall 106 of the elevator car 102 or the component may be disposed on a second side of the component support 242 so as to face towards the ceiling 108 of the elevator car 102 when the protector 200 is installed on an internal wall 106 of the elevator car 102. In any of the examples of the disclosure, the component or electrical device may be attached to the component support 242 by any suitable means, for example with adhesive or fasteners such as screws or magnets (not shown).

In at least some examples of the disclosure, the protector 200 may comprise a diffuser. The diffuser may comprise any of a light diffuser, sound diffuser, scent diffuser or any other type of diffuser known in the art. When the diffuser comprises a light diffuser 260, the light diffuser 260 may scatter the light emitted from the lighting device 240 to create a visual effect. The visual effect may include, but is not limited to, reducing the brightness and/or making the emitted light softer. The light diffuser 260 may be translucent. The light diffuser 260 may be made of plastic. The light diffuser 260 may be disposed against the protective panel 202 of the protector 200. In any example of the disclosure, the spacer 288 and/or the light diffuser 260 may be configured to close a gap formed between the protective panel 202 and an internal wall 106 when the protector 200 is installed against the internal wall 106. The gap may be closed at an upper end of the protector 200 such that removal of the protector 200 by passengers or other unauthorised personnel is made more difficult.

The diffuser may be retained against the protective panel 202 by a diffuser retainer 262. In examples of the disclosure including a light diffuser 260, the diffuser retainer 262 and the light diffuser 260 may be disposed between the lighting device 240 and the passenger compartment 104 such that all of the light emitted from the lighting device 240 passes through the light diffuser 260 before entering the passenger compartment 104. In at least some examples where the light diffuser 260 is disposed on top of the component support 242, the diffuser retainer 262 may be disposed above the lighting device 240. In at least some examples where the light diffuser 260 is disposed below the component support 242, the diffuser retainer 262 may be disposed below the lighting device 240. The diffuser retainer 262 may be formed integrally with the protective panel 202 (for example, by extrusion as will be described further below) or may be attached to the protective panel 202.

In at least some of the examples of the disclosure, the diffuser retainer 262 may comprise a diffuser support 264 which extends from the first side 202*a* of the protective panel 202 (see FIG. 5). In alternative examples of the disclosure, the diffuser support 264 may extend from the second side 202*b* of the protective panel 202 (see FIG. 6). In all examples of the disclosure including a diffuser retainer 262, the diffuser retainer 262 may comprise a lip 266 disposed at a distal end of the diffuser support 264 that extends away from the diffuser support 264. In at least some examples, the diffuser support 264 may extend substantially perpendicularly from the protective panel 202 and the lip 266 may extend substantially parallel with the protective panel 202. The diffuser retainer 262 may thereby comprise an "L" shape.

In at least some examples of the disclosure, the light diffuser 260 may comprise a diffuser slot 268. The diffuser slot 268 may have a shape similar to that of the diffuser retainer 262. The light diffuser 260 may be assembled onto the diffuser retainer 262 such that the diffuser retainer 262 is contained within the diffuser slot 268. In alternative examples, the light diffuser 260 may be disposed on top of, below, or on the side of the diffuser retainer 262 and may be attached to the diffuser retainer 262 by any suitable means, for example through the use of an adhesive or a fastener such as, but not limited to, a screw (not shown). In one example, the light diffuser 260 may be configured to be disposed between the protective panel 202 and the internal wall 106 shown by the dotted line 50. In another example, the light diffuser 260 may be configured to be disposed between the protective panel 202 and the passenger compartment 104. In any example of the disclosure wherein the diffuser comprises any of a sound diffuser, scent diffuser or any other type of diffuser, the diffuser may be attached to the protective panel 202 through the use of similar features to those described above.

In any of the examples above, the protector 200 may further comprise a foot 290 extending from the protective panel 202. The foot 290 may be configured to contact the floor 110 of the elevator car 102 when the protector 200 is attached to the internal wall 106 of the elevator car 102. The foot 290 may be formed integrally with the protective panel 202 (for example, by extrusion as will be described further below) or may be attached to the protective panel 202. The foot 290 may be configured to space the protective panel 202 from the internal wall 106.

In at least some examples of the disclosure, the protective panel 202 and/or some other parts of the protector 200, including but not limited to any combination of parts including the foot 290, the retainer assembly 220, the support 210, the cable support 252, the electrical support 242, the diffuser retainer 262 and the spacer 288 may be made of a metal, for example aluminium. In at least some examples of the disclosure, the protective panel 202 and/or any of the combination of parts listed above may be manufactured by extrusion. Alternatively, the protective panel 202 and/or any of the combination of parts listed above may comprise any other suitable material, for example another material capable of extrusion, such as a plastic or aluminium.

In at least some examples of the disclosure, the protective panel 202 and/or other parts of the protector 200, including but not limited to any combination of parts including the foot 290, the retainer assembly 220, the support 210, the cable support 252, the electrical support 242, the diffuser retainer 262 and the spacer 288 may be made of a non-magnetic material. By using a non-magnetic material for the protective panel 202 and/or other parts of the protector 200 described above, the force of magnetic attraction between the or each magnet 204 and the internal wall 106 of the elevator car 102 can be increased.

In at least some examples of the disclosure, the protective panel 202 may provide floor level protection or may be a kickplate.

A method for attaching the protector 200 of any of the examples above to an internal wall 106 of an elevator car 102 may include mounting one or more magnets 204 to the protective panel 202, wherein the magnets 204 are retained against the support 210 by a retainer assembly 220. The method further includes installing the protector 200 adjacent to the internal wall 106 such that magnetic attraction between the one or more magnets 204 and the internal wall 106 causes the protector 200 to be attached to the internal wall 106.

Mounting a magnet 204 to the protector 200 may comprise sliding the magnet 204 into the space 206 defined by the first and second retainer lips 222*b*, 224*b*, the support pad 212 and the first and second retainer brackets 222*a*, 224*a*. The method may further comprise sliding the one or more magnets 204 along a part or all of the length l of the protector 200, for example such that they are regularly spaced along the length l of the protector 200. In other examples, or in addition to the above, mounting a magnet 204 to the protector 200 may comprise inserting a fastener 230 to extend through at least a part of the magnet 204 to fix the magnet 204 to the support 210.

In at least some examples of the disclosure seen, for example, at FIGS. 7*a* and 7*b*, the protector 200 may comprise a removal assembly 300 which is attachable to the protector 200. It will be understood that although shown with a particular example protector in FIGS. 7*a* and 7*b*, the removal assembly 300 may be used with a protector according to any example of the disclosure including, but not limited to the example protectors described above. The removal assembly 300 may comprise a bolt 302, a bore hole (not shown), and a fastener 304 through which the bolt 302 may extend. In at least some examples of the disclosure, the fastener 304 may be a rivet. The fastener 304 may extend through the bore hole. The bore hole may be disposed through the protective panel 202 at any point along the height or length of the protective panel 202, for example between the foot 290 and the support 210. In at least some of the examples of the disclosure which include the first and second retainers 222, 224, the bore hole may be disposed between the foot 290 and the second retainer 224. The fastener 304 may have a hollow radially inner portion, the radially inner surface of which may be threaded. The bolt 302 may have a threaded shaft configured to engage with the threaded radially inner surface of the hollow portion of the fastener 304. The shaft 308 of the bolt 302 may have a length longer than the depth Dp of the protector 200. (Where the depth Dp of the protector 200 corresponds to a distance between the second face 202*b* of the protective panel 202 and the internal wall 106 when the protector is installed against the internal wall 106).

In at least some examples of the disclosure, the protector 200 may comprise a plurality of removal assemblies 300 disposed along the length or height of the protector 200. Alternatively, the protector 200 may comprise only one removal assembly 300. It will further be understood that the bore hole may be present in the protective panel at all times or it may be formed by maintenance personnel when they wish to remove a protector 200 from the elevator car 102.

A method for removing the protector 200 as described in any of the examples above is also disclosed. It will be understood that the method can be used in relation to any example of the protector 200 described previously. The method for removing the protector 200 may use the removal assembly 300 described above and may comprise: forming a bore hole in in the protective panel 202 if not already present; inserting a fastener 304 into a bore hole in the protective panel 202 and attaching the fastener 304 to the protective panel 202. The fastener 304 attached to the protective panel 202 is shown in FIG. 7A. The method then comprises inserting a bolt 302 through the fastener 304 as shown in FIG. 7B such that the threads of the shaft 308 of the bolt 302 engage the threads of the fastener 304; rotating the bolt 302 (for example, using a screw driver) so as to continue to pass the bolt 302 through the fastener 304 such that the bolt 302 extends outwardly from the protective panel 202 towards the internal wall 106 and then comes into contact with the internal wall 106 (as shown in FIG. 7B); further rotating the bolt 302 so as to continue to pass the bolt 302 through the fastener 304 such that the protector 200 is pushed away from the internal wall 106 by the bolt 302 in a direction N normal to the internal wall 106, to create a clearance gap (not shown) between the protector 200 and the internal wall 106; and manually removing the protector 200 from the internal wall 106. At least in some examples, the clearance gap is large enough to allow a maintenance person to insert their hand between the protector 200 (for example at the diffuser 260 end) and the internal wall 106.

An alternative method for removing a protector 200 from a wall which may use an alternative removal assembly 300 is also provided. It will be understood that the alternative method can be used in relation to any example of the protector 200 described previously. The alternative method is illustrated in FIGS. 8*a* and 8*b*, which depict the protectors of FIGS. 5 and 6 respectively. In the alternative method, the removal assembly 300 again comprises one or more bore holes (not shown) as described above, and also comprises one or more bolts 302 and one or more fasteners 304. In at least some examples of the disclosure including the alternative method, the one or more fasteners may comprise one or more rivets and the one or more rivets may be threaded. However, any suitable fastener may be used, for example the one or more fasteners 304 may alternatively comprise one or more nuts. The one or more bolts 302 may be plane head bolts, comprising a plane head 306. The diameter of the plane head 306 may be less than the distance in the height dimension between the foot 290 and the lower support bracket 214. In at least some examples of the disclosure including the first and second retainers 222, 224, the diameter of the plane head 306 may be smaller than the distance in the height dimension between the foot 290 and the second retainer 224.

The alternative method may comprise: attaching a fastener 304 to the internal wall 106 of the elevator car 102; inserting a bolt 302 into the fastener 304 such that the threads of the bolt 302 engage the threads of the fastener 304; forming a bore hole in the protective panel 202 if not already present; passing a tool through the bore hole and into engagement with the bolt 302; loosening the bolt 302 with the tool such that it moves in a direction normal to the internal wall 106 and such that a proximal end of the bolt 302, opposite the end received in the fastener 304, contacts the protective panel 202, wherein the plane head 306 is disposed at the proximal end of the bolt 302; continuing to loosen the bolt 302 such that the protector 200 is pushed away from the internal wall 106 in a direction N normal to the internal wall 106 to create a clearance gap (not shown) between the protector 200 and the internal wall 106; and manually removing the protector 200 from the internal wall 106. In at least some examples of the disclosure including the alternative method, the steps of attaching the fastener 304 to the internal wall 106; and inserting the bolt 302 into the fastener 304 such that the threads of the bolt 302 engage the threads of the fastener 304, may be performed before the protector 200 is attached to the internal wall 106.

A method for replacing the protector 200 as described in any of the examples above is also disclosed. The method comprises: pulling a first protector 200 away from the wall 106 of an elevator car 102 with a force greater than that exerted by the one or more magnets 204, optionally by one of the example removal methods described above; and installing a second protector 200 on the wall 106, the protective panel 202 of the second protector 200 being attached to the wall 106 by the one or more magnets 204.

It will be appreciated by those skilled in the art that the disclosure has been illustrated by describing one or more examples thereof, but is not limited to these examples; many variations and modifications are possible, within the scope of the accompanying claims.

What is claimed is:

1. A protector (200) for an elevator car (102), the protector (200) comprising:

a protective panel (202); and one or more magnets (204) mounted to the protective panel (202), wherein the one or more magnets (204) are configured to be attracted to an internal wall (106) of a passenger compartment (104) of the elevator car (102) so as to retain the protective panel (202) against the internal wall (106);

a lighting device (240) configured to emit light upwardly into the passenger compartment (104) of the elevator car (102), the lighting device positioned vertically above the one or more magnets (204);

a light diffuser (260) positioned vertically above the lighting device (240).

2. The protector (200) of claim 1, comprising a support (210) for mounting at least one of the one or more magnets (204) to the protective panel (202), wherein the support (210) spaces the one or more magnets (204) from the protective panel (202).

3. The protector (200) of claim 2, comprising a retainer assembly (220), wherein the retainer assembly (220) retains at least one of the one or more magnets (204) against the support (210).

4. The protector (200) of claim 3, wherein the retainer assembly (220) comprises first and second retainers (222, 224) extending outwardly from the protective panel (202), wherein the first and second retainers (222, 224) partially overlap the at least one of the one or more magnets (204) such that the at least one of the one or more magnets (204) is retained against the support (210).

5. The protector (200) of claim 3, wherein the retainer assembly (220) comprises a fastener (230) extending through at least a part of at least one of the one or more magnets (204) to fix the at least one of the one or more magnets (204) to the support (210).

6. The protector (200) of claim 1, comprising a component, wherein the component comprises one or more of an air freshener, a sound system, one or more sensors and a conduit for a fluid.

7. The protector (200) of claim 6, wherein the component is disposed on a component support (242) extending away from the protective panel (202).

8. The protector (200) of claim 6, comprising an electrical cable (250) for powering and/or providing a signal to the lighting device (240) mounted in a gap defined by the protective panel (202) and a cable support (252).

9. An elevator car (102) comprising:

a passenger compartment (104) defined by a floor (110), one or more internal walls (106) and a ceiling (108); and one or more protectors (200) as claimed in claim 1, wherein the protective panel (202) of the or each protector (200) is retained against an internal wall (106) of the elevator car (102) by the one or more magnets (204).

10. An elevator car (102) as claimed in claim 9, wherein the one or more protectors (200) extend along the one or more internal walls (106) adjacent to the floor (110).

11. A method for attaching the protector (200) of claim 1 to an internal wall (106) of an elevator car (102), the method comprising:

installing the protector (200) adjacent to the internal wall (106), wherein the protective panel (202) is held against the internal wall (106) by the one or more magnets (204).

12. A method for removing the protector (200) of claim 1 from an internal wall (106) of an elevator car (102), the method comprising:

using a threaded screw mounted between the protector (200) and the internal wall (106) to push the protective panel (202) away from the internal wall (106).

13. A protector (200) for an elevator car (102), the protector (200) comprising:

a protective panel (202);

one or more magnets (204) mounted to the protective panel (202), wherein the one or more magnets (204) are configured to be attracted to an internal wall (106) of a passenger compartment (104) of an elevator car (102) so as to retain the protective panel (202) against the internal wall (106):

a support (210) for mounting at least one of the one or more magnets (204) to the protective panel (202), wherein the support (210) spaces the one or more magnets (204) from the protective panel (202):

a retainer assembly (220), wherein the retainer assembly (220) retains at least one of the one or more magnets (204) against the support (210);

wherein the retainer assembly (220) comprises first and second retainers (222, 224) extending outwardly from the protective panel (202), wherein the first and second retainers (222, 224) partially overlap the at least one of the one or more magnets (204) such that the at least one of the one or more magnets (204) is retained against the support (210):

wherein the first and second retainers (222, 224) each comprise a retainer bracket (222*a*, 224*a*) and a retainer lip (222*b*, 224*b*), wherein the first and second retainer brackets (222*a*, 224*a*) extend away from the protective panel (202), and the first and second retainer lips (222*b*, 224*b*) are disposed at the distal ends of the first and second retainer brackets (222*a*, 224*a*), wherein the first and second retainer lips (222*b*, 224*b*) extend over part of the at least one of the one or more magnets (204), such that the at least one of the one or more magnets (204) is retained between the first and second retainer lips (222*b*, 224*b*) and the support (210).

* * * * *